United States Patent Office 3,354,154
Patented Nov. 21, 1967

3,354,154
2β,3β - ALKYLIDENEDIOXY-6-HYDROXY-22.23-BIS-NORCHOL-7-ENOIC ACID ALKYL ESTERS AND PROCESS FOR THE PRODUCTION THEREOF
John A. Edwards, John H. Fried, and John B. Siddall, Palo Alto, Calif., assignors to Syntex Corporation, Panama, Panama, a corporation of Panama
No Drawing. Filed Jan. 26, 1966, Ser. No. 523,019
12 Claims. (Cl. 260—239.55)

This is a continuation-in-part of copending application Serial No. 506,410, filed Nov. 4, 1965.

The present invention is directed at novel polyhydroxy steroids and to processes for their preparation. Specifically, this invention is directed at a process for preparing compounds of the formula:

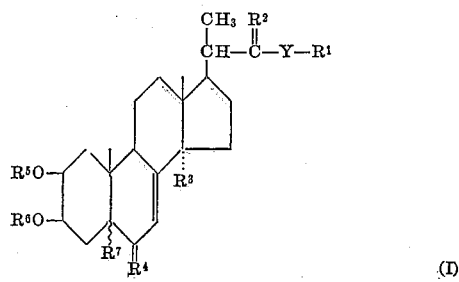

(I)

wherein $R^1$ is hydrogen, hydroxy, or a hydrocarbon carboxylic acyloxy group of less than 12 carbon atoms;
$R^2$ is an oxygen atom or (hydrogen, hydroxy);
$R^3$ is hydrogen or hydroxy;
$R^4$ is an oxygen atom or (hydrogen, hydroxy);
each of $R^5$ and $R^6$ is hydrogen or a hydrocarbon carboxylic acyl group of less than 12 carbon atoms, or taken together, the group

in which each of A and B is hydrogen or lower alkyl;
$R^7$ is α-hydrogen, β-hydrogen or α-hydroxy; and
Y is an alkylene group of from 3 to 8 carbon atoms, there being at least 3 carbon atoms between the valence bonds of said alkylene group. Moreover, the present invention is directed at the novel compounds of the above formula wherein $R^1$, $R^2$, $R^3$, $R^4$, $R^5$, $R^6$, $R^7$ and Y are as defined, but characteristized by the provision that when $R^1$, $R^2$ and $R^3$ are all hydroxy, at least one of $R^4$ and $R^7$ is also hydroxy.

The presence of "asymmetric" carbon atoms in several positions of the above formula permit the existence of isomeric forms. As noted in greater detail hereafter, the methods of the present invention generate both forms, unless otherwise noted, and these forms may be readily separated from one another through conventional methods, e.g., chromatography, fractional crystallization, or the like. Unless otherwise noted, all such isomeric forms are embraced by the present invention. Use of a wavy line, "ʃ" indicates both α and β configurations, either singularly or collectively. With specific reference to the configuration at C–20 and C–22, the designations α and β are used in accordance with the Fischer convention.

The term alkyl and derivations thereof such as alkylene, alkanoic, etc., denotes an aliphatic hydrocarbon group. When qualified by the term "lower," such a group will contain no more than 6 carbon atoms. The alkylene group designated by Y will contain from 3 to 8 carbon atoms, but in all cases will comprise a straight chain of 3 carbon atoms between $R^1$ and the remainder of the nucleus. This chain of 3 or more carbon atoms may, however, be substituted by one or more alkyl groups of 5 or less carbon atoms.

The foregoing compounds demonstrate the ability to affect the growth of insects and are accordingly useful in the control and management of insect population, in addition to finding broad use in biological research. They may be employed for insect control in the same manner as the related insect hormone, ecydsone, whose structure and use are known. Furthermore, the process of the present invention is particularly valuable in synthesizing this compound, and many of the compounds of the present invention also serve as valuable intermediates in that synthesis.

The preparation of the compounds of the present invention, and with the appropriate selection of reagents, ecdysone, is described in the copending application specified above. Among the processes therein set forth in detail is the multistep conversion of a 3β-acyloxy-22,23-bisnorchol-5-enoic acid alkyl ester to 2β,3β-alkylidenedioxy-6-hydroxy-22,23-bisnorchol-7-enoic acid alkyl esters of the formula:

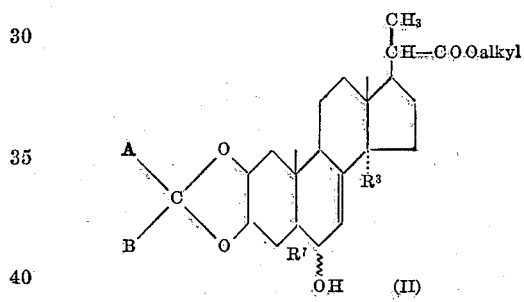

(II)

wherein A, B, $R^3$ and $R^7$ are as previously defined. Also set forth in said copending application is the subsequent conversion of compounds of Formula II, particularly those compounds wherein $R^7$ is β-hydrogen and $R^3$ is hydroxy, to various 5β-cholest-7-ene derivatives of Formula I. Utilizing the carbonyl group of the alkyl ester as the reaction site, this latter conversion employs various Grignard reagents in introducing the remainder of the side chain. The resultant compounds having a 22-keto group are then reduced to the corresponding 22α- and 22β-hydroxy derivatives with subsequent selective oxidation of the 6-hydroxy group, if desired, to yield the 6-keto compound.

It has now been discovered that by utilization of the same carbonyl group as the site of the reaction, alkylation of an intermediate ester of Formula II, hereinafter presented, may be advantageously realized through the use of a two-step synthesis to yield a 2β,3β-alkylidenedioxy-6-hydroxycholest-7-en-22-one of Formula IV. This product, depending upon the starting material, may be of either the 5α or 5β configuration and, in addition, may be optionally substituted in either or both of the 5α and 14α positions by hydroxy groups, and further may have substitution in the side chain in the form of either or both of alkyl groups and a hydroxy group, the latter being protected in the form of a tetrahydropyranyl ether. These transformations may be represented as follows:

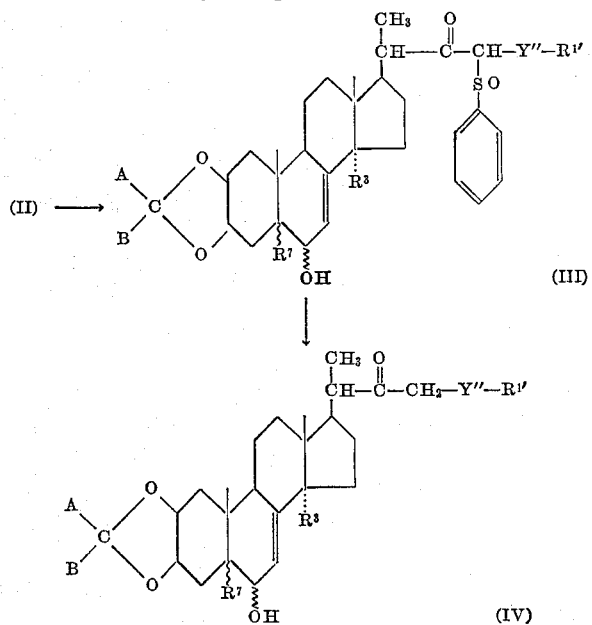

In the foregoing, A, B, $R^3$ and $R^7$ are as above defined; $R^{1\prime}$ is hydrogen or tetrahydropyranyloxy and $Y''$ is alkylene of from 2 to 7 carbon atoms.

With reference to the above reaction sequence, the steroid of Formula II is treated in the presence of sodium hydride with the lithium salt of a sulfoxide of the formula:

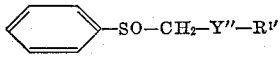

wherein $Y''$ and $R^{1\prime}$ are as previously defined. After isolation according to conventional techniques, the resulting 23-phenylsulfinylcholest-7-ene of Formula III, with optional substitution as indicated above, is treated with aluminum amalgam in an aqueous inert organic solvent such as aqueous tetrahydrofuran to yield the desired steroid of Formula IV.

The requisite intermediate of Formula V may be obtained via the reaction of the sodium salt of the appropriate halide, as for example one of the formula $BrY''R^{1\prime}$, and sodium phenylmercaptide to yield the corresponding sulfide which is then oxidized to the sulfoxide via conventional procedures, e.g., through the use of sodium iodate. After drying, the sulfoxide is treated with phenyl lithium in the presence of sodium hydride to yield the lithium salt.

Reduction of the 22-keto steroid (IV) may be accomplished by treatment with an alkali aluminum hydride or an alkali aluminum tri-t-butoxy hydride, preferably lithium aluminum hydride in an anhydrous organic ether, such as tetrahydrofuran, resulting in the 22-hydroxy steroid (VI) which may contain both the 22α and 22β isomers. This mixture may be separated by conventional chromatographic techniques or, alternatively, the process may be continued using the mixture of 22β-hydroxy and 22α-hydroxy steroids with separation of the isomers performed at a later point.

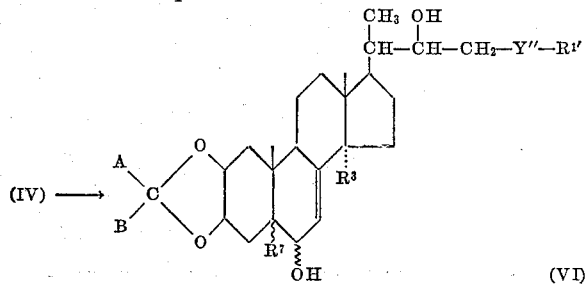

Regeneration of the 6-keto group may be next accomplished, if desired, as with manganese dioxide or 2,3-dichloro-5,6-dicyanobenzoquinone, with cleavage of the 2β,3β-alkylidenedioxy function and, when $R^{1\prime}$ is tetrahydropyranyloxy, this group as well, being realized through the action of acid, such as hydrochloric, oxalic or formic acid, preferably the former. These reactions may be reppresented as follows:

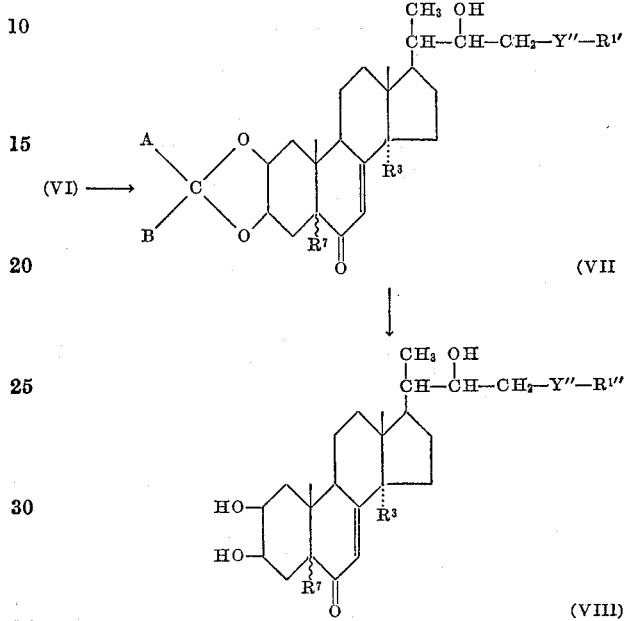

In the above, $R^{1\prime\prime}$ is hydrogen or hydroxy and A, B, $R^3$, $R^7$ and $Y''$ is as previously described.

The above processes may thus be utilized to prepare the known insect hormone ecdysone, namely, the compound of Formula VIII wherein $Y''$ is the alkylene group —$CH_2$—$C(CH_3)_2$—, $R^3$ is hydroxy, $R^7$ is β-hydrogen, and the configuration of the 21-methyl group with regard to the 20-carbon atom is β while that of the 22-hydroxy group is β. Alternatively, with various modifications, this process may be employed in the preparation of other valuable compounds. Accordingly, by eliminating the step of 5α-deacetoxylation, and thus the epimerization of the C–5 hydrogen as well, both described in said copending application, there are obtained upon execution of the other steps herein described, compounds bearing a 5α-hydroxy group [$R^1$=α-hydroxy]. Alternatively, or in addition, the oxidation of the 6-hydroxy group may be eliminated to yield 6α and 6β-hydroxy derivatives with the isomers then being separated (if not previously performed). Likewise, elimination of the 14-hydroxylation step, also described in said copending application, yields compounds bearing a 14α-hydrogen [$R^3$=hydrogen]. So too, by dispensing with the reduction of the 22-keto intermediate, one obtains compounds having the 22-carbonyl group intact. Various combinations of these modifications are typified hereafter and others will be apparent to those skilled in the art from the present disclosure of this invention.

Particularly valuable intermediates are those represented by Formulas II, III and IV above.

The following examples will serve to further typify the nature of this invention, but should not be construed as a limitation thereof.

*Example 1*

Fifty grams of 3β-acetoxy-22,23-bisnorchol-5-enoic acid methyl ester are dissolved in 500 ml. of hot (88%) formic acid and held at about 70° C. for about 0.5 hour. Thereafter, the solution is cooled to about 20° C. and 60 ml. of (30%) hydrogen-peroxide is added cautiously and the resulting mixture is stirred for two hours, whereupon about 750 ml. of hot water is added. A gum is formed which is separated by decantation and filtration. The crude product is washed with water and dissolved in 800 ml. of hot methanol which contains a mixture of 38 g. of potassium hydroxide and 65 ml. of water. Saponification to the triol is complete after approximately two minutes. Neutralization of the solution with acetic acid followed by dilution with cold water results in the formation of a solid which is filtered and dried, affording 3β,5α,6β-trihydroxy-22,23-bisnorcholanoic acid methyl ester.

A solution containing 50 g. of 3β,5α,6β-trihydroxy-22,23-bisnorcholanoic acid methyl ester in aqueous dioxane (50 ml. water, 450 ml. dioxane) is treated at about 20° C. with 29 g. of N-bromosuccinimide (1.25 moles). The oxidation is complete after about 1.5 hours, whereupon excess N-bromosuccinimide is decomposed by the addition of aqueous sodium sulfite until the solution is substantially colorless. The addition of about 1.2 liters of cold water to the solution results in the formation of a white solid. The mixture is cooled in ice and the solid collected by filtration and dried by suction to yield 3β,5α-dihydroxy-6-keto-22,23-bisnorcholanoic acid methyl ester.

To a stirred solution of 38 g. of 3β,5α-dihydroxy-6-keto-22,23-bisnorcholanoic acid methyl ester in 150 ml. of pyridine, cooled to 0° C., is added 50 g. of p-toluenesulfonyl chloride. The mixture is allowed to stand at about 20° C. for about 16 hours and is then diluted slowly by the addition of water while cooling in an ice bath, whereupon a solid precipitates. The thus-formed solid is separated, washed with water to remove pyridine and dried, thus yielding 5α-hydroxy-6-keto-3β-p-toluenesulfonyloxy-22,23-bisnorcholanoic acid methyl ester, which may be further purified through recrystallization from methylene chloride:hexane.

To a mixture of 18 g. of lithium carbonate and 210 ml. of dimethyl acetamide at about 150° C. under nitrogen are added quickly 30 g. of the foregoing crystallized tosylate derivative. The mixture is maintained at a temperature of approximately 150° C. for 10 minutes and then cooled rapidly to about 0° C. The cooled mixture is added to cold water, yielding a solid which is collected by filtration, dried and extracted with benzene:water. These extracts are concentrated to give 5α-hydroxy-6-keto-22,23-bisnorchol-2-enoic acid methyl ester which is recrystallized from methylene chloride:hexane.

To a stirred mixture containing 326 mg. of 5α-hydroxy-6-keto-22,23-bisnorchol-2-enoic acid methyl ester, 10 ml. of dry acetic acid and 260 mg. of iodine is added 167 mg. of dry silver acetate, portionwise, over a one-hour period. Stirring is continued for approximately six hours, whereupon the reaction mixture is taken up in methylene chloride, filtered, and washed with aqueous sodium thiosulfate and water. The methylene chloride is evaporated in vacuo at room temperature and the residue therefrom is treated with excess silver nitrate and 10% aqueous methanol for approximately 10 minutes at about 70° C. The resulting reaction mixture is cooled, filtered, and the filtrate taken up in methylene chloride. This organic solution is washed with water and evaporated under vacuum. The thus-obtained crude product is chromatographed on silica gel, eluting with ethyl acetate:hexane mixtures. The desired 2β,3β,5α-trihydroxy-6-keto - 22,23 - bisnorcholanoic acid methyl ester is obtained by mild alkaline hydrolysis of the most polar of the products from the column.

A mixture containing 170 mg. of 2β,3β,5α-trihydroxy-6-keto-22,23-bisnorcholanoic acid methyl ester and 2 ml. of 3:7 acetic anhydride:pyridine is allowed to stand at 90° C. for about three hours. The mixture is then concentrated to dryness under vacuum to afford 2β,3β-diacetoxy-5α-hydroxy-6-keto-22,23-bisnorcholanoic acid methyl ester which is recrystallized from methanol.

Example 2

A solution containing 3.8 g. of 2b,3b-diacetoxy-5α-hydroxy-6-keto-22,23-bisnorcholanoic acid methyl ester, 16 ml. of acetic acid, 2.4 ml. of 15% hydrogen bromide in acetic acid, and 9 ml. of bromine in acetic acid (127 mg. of bromine per ml. of acetic acid) is stirred at room temperature for four hours. Thereafter, excess bromine is decomposed by the addition of 2% aqueous sodium sulfide and approximately 150 ml. of water is then added to complete precipitation. Filtration and drying by suction yields 7α-bromo-2β,3β-diacetoxy - 5α - hydroxy - 6 - keto-22,23-bisnorcholanoic acid methyl ester which is recrystallized from methylene chloride:methanol.

A mixture of 450 mg. of this 7α-bromo steroid (VI), 12 ml. of dimethyl acetamide and 400 mg. of lithium carbonate is refluxed under an atmosphere of nitrogen for 12 minutes and thereafter rapidly cooled in an ice bath. The reaction mixture is washed, filtered, and the filtrate extracted with methylene chloride. The methylene chloride extracts are thereafter washed with water and saturated sodium chloride solution and concentrated in vacuo to yield 2β,3β-diacetoxy-5α-hydroxy-6-keto-22,23-bisnorchol-7-enoic acid methyl ester and 2β,3β - diacetoxy - 5α - hydroxy-6-keto-22,23-bisnorchol - 8(14) - enoic acid methyl ester. These compounds may be separated at this point by chromatography on silica gel. Alternatively, the mixture may be carried forward and separated at a later stage.

A solution containing 5 ml. of acetic acid, 2 ml. of acetic anhydride and 450 mg. of 2β,3β-diacetoxy-5α-hydroxy-6-keto-22,23-bisnorchol-7-enoic acid methyl ester and 100 mg. of p-toluenesulfonic acid is stirred at room temperature for 3.5 hours and then added cautiously to dilute aqueous potassium bicarbonate and subjected to extraction with methylene chloride. The methylene chloride extracts are thereafter washed with water and saturated sodium chloride solution and concentrated to dryness under vacuum, yielding 6-keto-2β,3β,5α-triacetoxy-22,23-bisnorchol-7-enoic acid methyl ester.

This triacetate may also be obtained from the triol by successive acid-catalyzed acetylation, halogenation and dehydrohalogenation.

Example 3

A mixture containing 140 mg. of selenium dioxide, 10 ml. of dry dioxane, and 265 mg. of 6-keto-2β,3β,5α-triacetoxy-22,23-bisnorchol-7-enoic acid methyl ester is refluxed for four hours. Thereafter, the reaction mixture is cooled, filtered, and the filtrate is washed with dilute aqueous potassium bicarbonate and extracted with methylene chloride. The methylene chloride extracts are washed with saturated sodium chloride solution, dried and filtered through Celite diatomaceous earth. The filtrate is concentrated to dryness affording 14α-hydroxy - 6 - keto-2β,3β,5α-triacetoxy-22,23-bisnorchol-7-enoic acid methyl ester.

Example 4

To a solution of 90 mg. of 14α-hydroxy - 6 - keto-2β,3β,5α-triacetoxy-22,23-bisnorchol-7-enoic acid methyl ester and 5 ml. of acetone is added 4 ml. of a 25% solution of chromous chloride in 1 N hydrochloric acid. The solution is allowed to stand for two minutes, whereupon it is poured into a water:methylene chloride mixture. The organic layer is separated and washed successively with dilute aqueous potassium bicarbonate, water, and saturated sodium chloride solution, dried over sodium sulfate, and concentrated to dryness, thus yielding 2β,3β-diacetoxy-14α-hydroxy-6-keto - 22,23 - bisnor-5α-chol-7-enoic acid methyl ester.

Example 5

A mixture of 1 g. of 2β,3β-diacetoxy-14α-hydroxy-6-keto-22,23-bisnor-5α-chol-7-enoic acid methyl ester, 0.33 g. of potassium carbonate, and 100 ml. of 90% aqueous methanol is allowed to stand for approximately one hour at room temperature. Thereafter, ethyl acetate and saturated sodium chloride solution are added to the mixture and the layers separated. The organic layer is neutralized, washed with water, dried over sodium sulfate and concentrated to dryness at room temperature to yield 2β,3β,14α-trihydroxy-6-keto - 22,23 - bisnor-5α-chol-7-enoic acid methyl ester.

Example 6

A mixture containing 1 g. of 2β,3β,14α-trihydroxy-6-keto-22,23-bisnor-5α-chol-7-enoic acid methyl ester, 0.33 g. of potassium carbonate, and 100 ml. of 90% aqueous methanol is allowed to stand for approximately 20 hours at room temperature. The product is recovered by extraction with ethyl acetate in the manner described in the preceding paragraph and consists of a mixture of 2β,3β,14α-trihydroxy-6-keto - 22,23 - bisnor-5β-chol-7-enoic acid methyl ester and the 5α epimer which are separated by chromatography. The 5α epimer may be recycled for further preparation of the 5β compound.

Example 7

A mixture containing 0.5 g. of 2β,3β,14α-trihydroxy-6-keto-22,23-bisnor-5β-chol-7-enoic acid methyl ester, 30 ml. of acetone, and 50 mg. of p-toluenesulfonic acid is allowed to stand at room temperature for approximately two hours. The reaction mixture is thereafter poured into cold, saturated aqueous potassium bicarbonate solution and extracted with ethyl acetate. The ethyl acetate extracts are washed with water to neutrality, dried over sodium sulfate and concentrated to dryness at room temperature to yield 2β,3β-isopropylidenedioxy-14α-hydroxy-6-keto-22,23-bisnor-5β-chol-7-enoic acid methyl ester.

A mixture of 1 g. of this product, 100 ml. of anhydrous tetrahydrofuran, and 2 g. of lithium aluminum tri-(t-butoxy) hydride is stirred at reflux for approximately two hours. The reaction mixture is stirred with ethyl acetate and then with saturated sodium chloride solution. The mixture is next filtered and the filtrate extracted with ethyl acetate. The ethyl acetate extracts are washed with water, dried over sodium sulfate, and concentrated to dryness under vacuum to yield 2β,3β-isopropylidenedioxy-6,14α-dihydroxy-22,23-bisnor-5β-chol-7-enoic acid methyl ester which may be separated into the 6α and 6β isomers or may be used as a mixture of the two.

Example 8

To 780 mg. of 2β,3β-isopropylidenedioxy-6,14α-dihydroxy-22,23-bisnor-5β-chol-7-enoic acid methyl ester in 15 ml. of tetrahydrofuran under nitrogen at 0° C. is added 100 mg. of sodium hydride. After stirring this mixture for two hours, 82.0 ml. of a suspension of the lithium salt of 1-phenylsulfinyl-3-methyl - 3 - tetrahydropyranyloxybutane, prepared as below, are added. This mixture is stirred for 17 hours at 0° C., diluted with 800 ml. of water and exrtacted five times with 150 ml. portions of methylene chloride. The combined organic layers are washed thrice with 500 ml. portions of saturated sodium chloride solution, dried over sodium sulfate and evaporated in vacuo. The residue is chromatographed on silica, eluting with 20:1 chloroform:methanol, to yield 2β,3β-isopropylidenedioxy-6,14α-dihydroxy - 23 - phenylsulfinyl - 25 - tetrahydropyranyloxy-5β-cholest-7-en-22-one which is subjected to the following procedure without further purification.

To a solution of this steroid (650 mg.) in 45 ml. of 9:1 tetrahydrofuran:water are added aluminum amalgam, prepared by dipping 400 mg. of 1 cm.² pieces of aluminum foil in a 2% aqueous solution of mercuric chloride for 10 seconds and rinsing with ethanol and ether. After stirring for 90 minutes, the mixture is filtered, diluted with 600 ml. of water and extracted five times with 150 ml. portions of methylene chloride. The combined extracts are washed twice with 250 ml. portions of water and 500 ml. of saturated sodium chloride solution. After drying over sodium sulfate, the solution is evaporated in vacuo to yield 2β,3β - isopropylidenedioxy-6,14α-dihydroxy-25-tetrahydropyranyloxy-5β-cholest-7-en-22-one.

The requisite lithium salt of 1-phenylsulfinyl-3-methyl-3-tetrahydropyranyloxybutane may be prepared as follows. To a solution of 110 g. of thiophenol and 54 g. of sodium methoxide in 500 ml. of dry methanol are added under nitrogen and with stirring, 251 g. of 1-bromo-3-methyl-3-tetrahydropyranyloxybutane. The mixture is stirred for 16 hours, diluted with 4 liters of water and extracted five times with 500 ml. portions of ethyl ether. The combined organic extracts are washed with water, 3% aqueous sodium hydroxide solution and with saturated aqueous sodium chloride solution. After drying the solution over sodium sulfate, the mixture is evaporated. A solution of 140 g. of this intermediate sulfide in 1.5 liters of 50% aqueous methanol is added at 5° C. to 107 g. of sodium iodate in 1.5 liters of 50% aqueous methanol. This mixture is stirred at about 0° C. for 3.5 hours and filtered. The filtrate is diluted with 6 liters of water and extracted six times with 400 ml. portions of methylene chloride. The combined organic extracts are washed twice with 2 liters of saturated sodium chloride solution, dried over sodium sulfate, and evaporated to yield 1-phenylsulfinyl - 3 - methyl-3-tetrahydropyranyloxybutane which, after chromatography on silica with 1:1 hexane:ethyl acetate, is injected (39.28 g.) as a tetrahydrofuran solution (300 ml.) into 0.6 g. of sodium hydride under nitgrogen. After stirring for one hour, 80 ml. of a 1.5 M solution of phenyl lithium in ether is added at 0° C. After stirring for 15 hours, this mixture is ready for use as described above.

Example 9

A mixture containing 1 g. of 2β,3β-isopropylidenedioxy-6,14α - hydroxy - 25 - tetrahydropyranyloxy - 5β-cholest-7-en-22-one, 100 ml. of anhydrous tetrahydrofuran, and 2 g. of lithium aluminum hydride is stirred at room temperature for approximately six hours. The reaction mixture is then diluted with ethyl acetate and saturated aqueous sodium chloride solution, filtered and extracted with ethyl acetate. These extracts are washed with water, dried over sodium sulfate, and concentrated to dryness under vacuum, yielding a mixture of 2β,3β-isopropylidenedioxy - 6,14α,22β ₋ trihydroxy - 25-tetrahydropyranyloxy-5β-cholest-7-ene and the corresponding 22α isomer. The mixture may be separated at this point by chromatography on silica gel or, alternatively, at a later stage in the synthesis.

Example 10

To a mixture of 1 g. of 2β,3β-ispropylidenedioxy-6,14α,22β - trihydroxy - 25-tetrahydropyranyloxy-5β-cholest-7-ene in 100 ml. of 1:1 chloroform:benzene is added 2.5 ml. of isopropanol followed by 10 g. of manganese dioxide. This mixture is stirred for 90 minutes, filtered, and the filtrate evaporated to dryness. The residue is purified by chromatography to yield 2β,3β-isopropylidenedioxy-14α,22β - dihydroxy - 25-tetrahydropyranyloxy-5β-cholest-7-en-6-one.

Example 11

A mixture containing 1 g. of 2β,3β-ispropylidenedioxy-14α,22β - dihydroxy-25-tetrahydropyranyloxy-5β-cholest-7-en-6-one, 90 ml. of 80% aqueous tetrahydrofuran, and 9 ml. of 1 N hydrochloric acid is allowed to stand at room temperature for about three hours. The reaction mixture is then washed to neutrality with potassium bicarbonate and extracted with ethyl acetate. The combined ethyl acetate extracts are washed with water, dried over sodium sulfate, and concentrated to dryness to yield 2β,3β,14α,22β,25 - pentahydroxy-5β-cholest-7-ene-6-one whose physical constants, after chromatography on silica with 9:1 chloroform:methanol, are in agreement with those reported in the literature.

Example 12

A mixture containing 265 mg. of 2β,3β-diacetoxy-5α-hydroxy - 6 - keto - 22,23-bisnorchol-7-enoic acid methyl ester, 140 mg. of selenium dioxide and 10 ml. of dry dioxane is refluxed for approximately four hours. The mixture is then cooled, filtered, and the filtrate washed with dilute aqueous potassium bicarbonate and extracted with methylene chloride. The methylene chloride phase is washed with saturated aqueous sodium diatomaceous earth. The filtrate is concentrated to dryness, affording 2β,3β - diacetoxy - 5α,14α - dihydroxy-6-keto-22,23-bisnorchol-7-enoic acid methyl ester.

Upon subjecting this compound to the hydrolysis procedure described in Example 5, there is obtained 2β,3β,5α,14α-tetrahydroxy-6-keto-22,23-bisnorchol-7-enoic acid methyl ester. This compound is then sequentially treated according to the procedures described in Examples 7 through 11, thereby forming as the final product, 2β,3β,5α,14α,22β,25-hexahydroxycholest-7-en-6-one.

Example 13

In a similar fashion to that described in the last paragraph of Example 12, 2β,3β-diacetoxy-5α-hydroxy-6-keto-22,23-bisnorchol-7-enoic acid methyl ester is hydrolyzed according to the procedure of Example 5 and the resulting 2β,3β,5α-trihydroxy compound is then utilized in the procedures of Examples 7 through 11, sequentially, thereby yielding upon completion of the last step, 2β,3β,5α,22β,25-pentahydroxycholest-7-en-6-one.

Example 14

6 - keto - 2β,3β,5α-triacetoxy-22,23-bisnorchol-7-enoic acid methyl ester is subjected sequentially to the procedures described in Examples 4 through 11, and upon completion of the steps therein described there is obtained 2β,3β,22β,25-tetrahydroxy-5β-cholest-7-en-6-one.

Example 15

2β,3β - isopropylidenedioxy - 6,14α-dihydroxy-25-tetrahydropyranyloxy-5β-cholest-7-ene-22-one is subjected to the procedure of Examples 10 and 11 in that order, and there is thus obtained 2β,3β,14α,25-tetrahydroxy-5β-cholest-7-ene-6,22-dione. Alternatively, by subjecting this same starting material to only the procedure of Example 11, there is obtained a mixture of 2β,3β,6α,14α,25-pentahydroxy - 5β - cholest - 7-en-22-one and 2β,3β,6β,14α,25-pentahydroxy-5β-cholest-7-en-22-one which may be separated by chromatography.

Example 16

By subjecting 2β,3β,14α - trihydroxy-6-keto-22,23-bisnor-5α-chol-7-enoic acid methyl ester to the procedures described in Examples 7 through 11, there is obtained 2β,3β,14α,22β,25-pentahydroxy-5α-cholest-7-en-6-one.

Example 17

By employing 1-phenylsulfinyl-3,3-dimethylbutane in place of 1-phenylsulfinyl-3-methyl-3-tetrahydropyranyloxybutane in the procedure of Example 8, and thereafter performing the procedures of Examples 9 through 11 in their given order, there is obtained 2β,3β,14α,22β-tetrahydroxy-25-methyl-5β-cholest-7-en-6-one.

Similarly, by use of propylphenylsulfoxide and isobutyl phenylsulfoxide, there are respectively obtained according to this reaction sequence, 2β,3β,14α,22β-tetrahydroxy-26,27 - bisnor-5β-cholest-7-en-6-one and 2β,3β,14α,22β-tetrahydroxy-24-methyl-26,27-bisnor - 5β - cholest - 7 - en-6-one.

What is claimed is:

1. The process for the preparation of compounds of the formula:

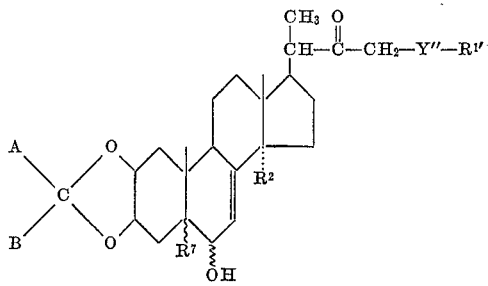

wherein
each of A and B is hydrogen or lower alkyl;
$R^{1}$ is hydrogen or tetrahydropyranyloxy;
$R^3$ is hydrogen or hydroxy;
$R^7$ is α-hydrogen, β-hydrogen or α-hydroxy; and
Y''' is alkylene of from 2 to 7 carbon atoms, which comprises treating a compound of the formula:

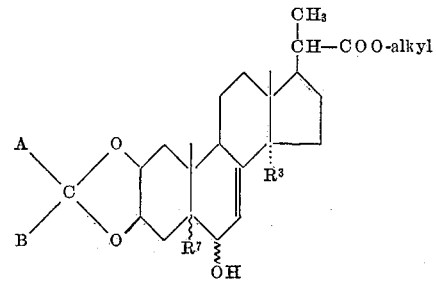

wherein A, B, $R^3$ and $R^7$ are as previously defined, with a lithium salt of a sulfoxide of the structure

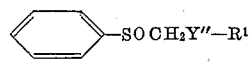

wherein Y''' and $R^{1'}$ are as previously defined, and thereafter treating the reaction product with aluminum amalgam.

2. The process of claim 1 wherein the grouping —Y'''—$R^{1'}$ has the structure

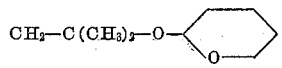

3. The process according to claim 1 wherein each of A and B is methyl;
$R^3$ is hydroxy;
$R^7$ is β-hydrogen; and
the grouping —Y'''—$R^{1'}$ has the structure

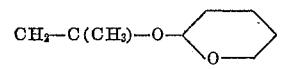

4. The process for the selective conversion of a 6-hydroxy steroid of the formula:

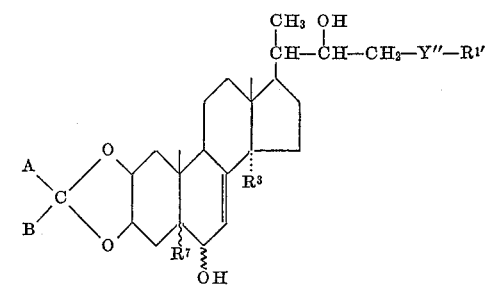

wherein
each of A and B is hydrogen or lower alkyl;
$R^{1'}$ is hydrogen or tetrahydropyranyloxy;
$R^3$ is hydrogen or hydroxy;
$R^7$ is α-hydrogen, β-hydrogen or α-hydroxy; and
Y''' is alkylene of from 2 to 7 carbon atoms to the corresponding 6-keto compound which comprises treating said 6-hydroxy steroid with manganese dioxide in the presence of isopropanol.

5. The process according to claim 5 wherein
each of A and B are methyl;
$R^3$ is hydroxy;
$R^7$ is β-hydrogen; and
the grouping —Y'''—$R^{1'}$ has the structure

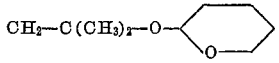

6. Compounds of the formula:

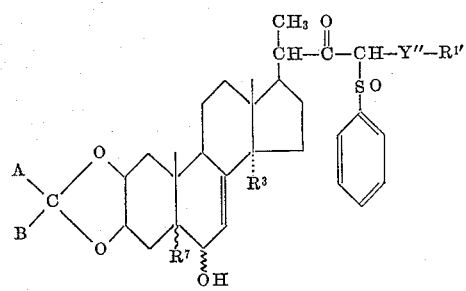

wherein each of A and B is hydrogen or lower alkyl;
$R^{1\prime}$ is hydrogen or tetrahydropyranyloxy;
$R^3$ is hydrogen or hydroxy;
$R^7$ is α-hydrogen, β-hydrogen or α-hydroxy; and
$Y''$ is alkylene of from 2 to 7 carbon atoms.

7. The compound according to claim 6 wherein
each of A and B is methyl;
$R^3$ is hydroxy;
$R^7$ is β-hydrogen; and
the grouping —$Y''$—$R^{1\prime}$ has the structure

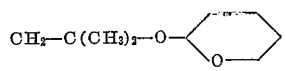

8. Compounds of the formula:

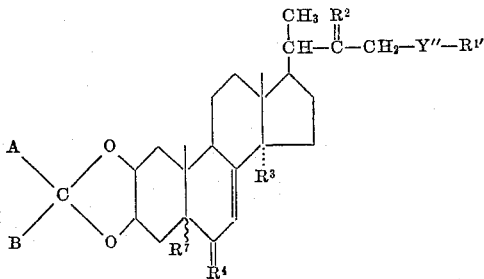

wherein each of A and B are hydrogen or methyl;
$R^{1\prime}$ is tetrahydropyranyloxy;
$R^2$ is an oxygen atom or (hydrogen, hydroxy);
$R^3$ is hydrogen or hydroxy;
$R^4$ is an oxygen atom or (hydrogen, hydroxy);
$R^7$ is α-hydrogen, β-hydrogen or α-hydroxy; and
$Y''$ is alkylene of from 2 to 7 carbon atoms.

9. The compound according to claim 8 wherein
each of A and B are methyl;
$R^2$ is an oxygen atom;
$R^3$ is hydroxy;
$R^4$ is (hydrogen, hydroxy);
$R^7$ is β-hydrogen; and
—$Y''$ is the group $CH_2$—$C(CH_3)_2$—, the tertiary carbon of said group being attached to $R^{1\prime}$.

10. The compounds according to claim 8 wherein
each of A and B are methyl;
$R^2$ is (hydrogen, hydroxy);
$R^3$ is hydroxy;
$R^4$ is (hydrogen, hydroxy);
$R^7$ is β-hydrogen; and
—$Y''$ is the group $CH_2$—$C(CH_3)_2$—, the tertiary carbon of said group being attached to $R^{1\prime}$.

11. The compound according to claim 8 wherein
each of A and B are methyl;
$R^2$ is (hydrogen, hydroxy);
$R^3$ is hydroxy;
$R^4$ is an oxygen atom;
$R^7$ is β-hydrogen; and
—$Y''$ is the group $CH_2$—$C(CH_3)_2$—, the tertiary carbon of said group being attached to $R^{1\prime}$.

12. The compound according to claim 8 wherein
each of A and B are methyl;
$R^2$ is an oxygen atom;
$R^3$ is hydroxy;
$R^4$ is an oxygen atom;
$R^7$ is β-hydrogen; and
—$Y''$ is the group $CH_2$—$C(CH_3)_2$—, the tertiary carbon of said group being attached to $R^{1\prime}$.

References Cited

Huber et al., Chemische Berichte (1965) July, p. 2410.

ELBERT L. ROBERTS, *Primary Examiner.*